United States Patent
Usui et al.

[19]

[11] Patent Number: 5,836,077
[45] Date of Patent: Nov. 17, 1998

[54] METHOD FOR FORMING GROOVES

[75] Inventors: Motonori Usui, Shimosuwa-machi; Tetsuya Matsuda, Nagano, both of Japan

[73] Assignee: Sankyo Seiki Mfg. Co., Ltd., Nagano-ken, Japan

[21] Appl. No.: 850,964

[22] Filed: May 5, 1997

[30] Foreign Application Priority Data

May 21, 1996 [JP] Japan .................................. 8-149846

[51] Int. Cl.⁶ .............................. B23C 3/28; F16C 33/00
[52] U.S. Cl. ...................................... 29/898.02; 409/132
[58] Field of Search ................................... 409/131, 132; 29/898.02, 898.048, 893.13, 898.054; 219/121.69; 384/120

[56] References Cited

U.S. PATENT DOCUMENTS

| | | | |
|---|---|---|---|
| 3,799,629 | 3/1974 | Caing ................................... | 29/898.02 |
| 5,198,637 | 3/1993 | Noda et al. .......................... | 219/121.69 |
| 5,524,464 | 6/1996 | Asada et al. ......................... | 409/131 X |
| 5,758,421 | 6/1998 | Asada ................................... | 29/898.02 |

FOREIGN PATENT DOCUMENTS 6-297226  10/1994  Japan .

*Primary Examiner*—William R. Briggs
*Attorney, Agent, or Firm*—McAulay Nissen Goldberg Kiel & Hand, LLP

[57] ABSTRACT

A grooving tool on a tool holder having a machining portion which is inserted into a circular work-hole formed in a workpiece provides grooves of predetermined width on the inner surface of said work-hole by moving the machining portion relatively and simultaneously in the axial and circumferential directions in the work-hole. The machining portion further comprises a machining tip portion consisting of an axial cutting edge, formed in parallel with the axial direction and a circumferential cutting edge, formed along the circumferential direction. Each of the lengths of the axial cutting edge and the circumferential cutting edge are set such that grooves of a predetermined width can be formed in the hole by relatively moving the axial cutting edge and the circumferential cutting edge.

4 Claims, 3 Drawing Sheets

METHOD FOR FORMING GROOVES

BACKGROUND OF THE INVENTION a) Field of the Invention

The present invention relates to a grooving tool for grooving the inner surface of a circular hole formed in a workpiece and also relates to a method of forming grooves using the grooving tool.

b) Description of the Related Art

It is common in various technical fields to use a grooving technique in which a circular hole is formed in a workpiece and its inner surface is grooved using a given tool.

For example, in a hydrodynamic bearing apparatus which generates a bearing hydrodynamic pressure with a bearing fluid, a circular hole is formed in a bearing member (a workpiece), and a given tool is inserted into the inner circle thereof to form herringbone or spiral hydrodynamic pressure-generating grooves on the inner surface of the hole by relatively moving a machining tip portion on the tool in the axial and circumferential directions in the hole.

Also, various grooving tools have been conventionally proposed for grooving the inner surface of a hole. For example, a tool disclosed in Japanese Patent Kokai H6-297226 (1994) is used for cutting herringbone-configured or spiral hydrodynamic grooves on the inner circle surface of bearing material; this tool is configured as shown in FIG. 5 such that a plurality of cutter protrusions 2 are circumferentially formed on the incoming edge side of a hole inserting unit 1. Each of these cutter protrusions 2 is formed in a diamond shape with cutting edges 4 and 5 which respectively extend in the cutting directions 3; the cutter protrusions 2 are relatively moved so as to traverse the cutting direction 3 to form a single hydrodynamic groove on the inner circle surface of the hole by one of the cutting edges 4 or 5.

However, with the grooving tool disclosed in the above mentioned Japanese patent, it is necessary to shape the cutter protrusion 2 (a machining portion) so as to be inclining against the center axis, i.e., to form it in a diamond shape because, when forming a single line of groove on the inner surface of the hole using one cutter, the groove is formed inclining with respect to the axial direction. Forming the cutter protrusion 2 in a diamond shape involves a complex 3-D machining; this decreases efficiency in manufacturing the tool, increases manufacturing errors, and degrades the precision of grooving.

OBJECT AND SUMMARY OF THE INVENTION

The present invention, then, aims to provide a grooving tool of which a machining portion for a highly precise grooving can be produced to improve productivity in grooving and the performance of the tool.

Further, the present invention aims to provide a method of forming hydrodynamic grooves, which solves the problem of degrading precision of machining.

In accordance with the invention, a grooving tool on a tool holder having a machining portion which is inserted into a circular work-hole formed in a workpiece provides grooves of predetermined width on the inner surface of said work-hole by moving the machining portion relatively and simultaneously in the axial and circumferential directions in the work-hole. The machining portion further comprises a machining tip portion consisting of an axial cutting edge, formed in parallel with the axial direction and a circumferential cutting edge, formed along the circumferential direction. Each of the lengths of the axial cutting edge and the circumferential cutting edge are set such that grooves of a predetermined width can be formed in the hole by relatively moving the axial cutting edge and the circumferential cutting edge.

DESCRIPTION OF THE PREFERRED EMBODIMENTS

Figure 1:
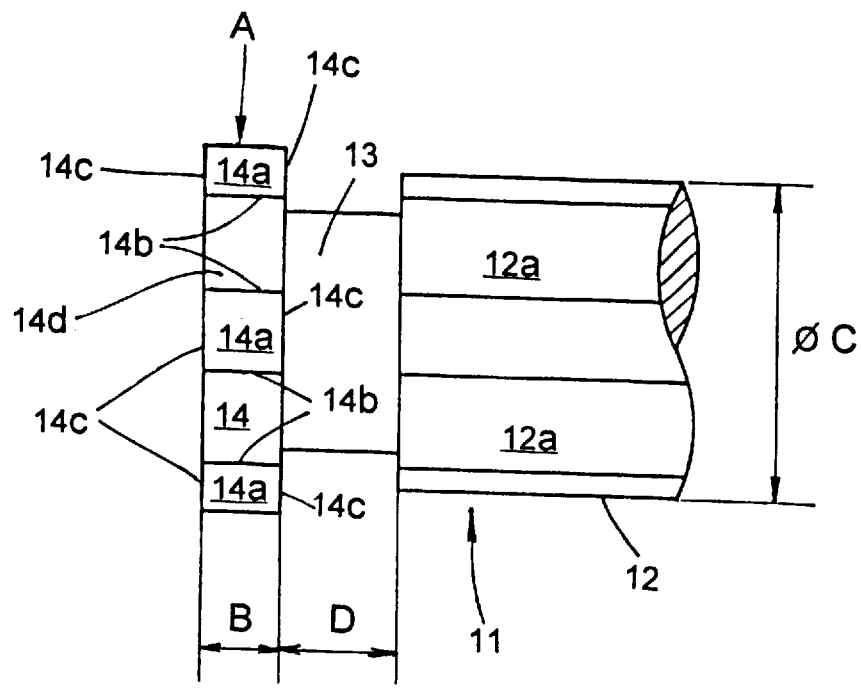
FIG. 1 is a side view of a grooving tool of the present invention.

An embodiment, in which a grooving tool of the present invention is applied to a tool for forming hydrodynamic pressure-generating grooves in a hydrodynamic bearing apparatus, is described in detail referring to the drawings.

Figure 2:
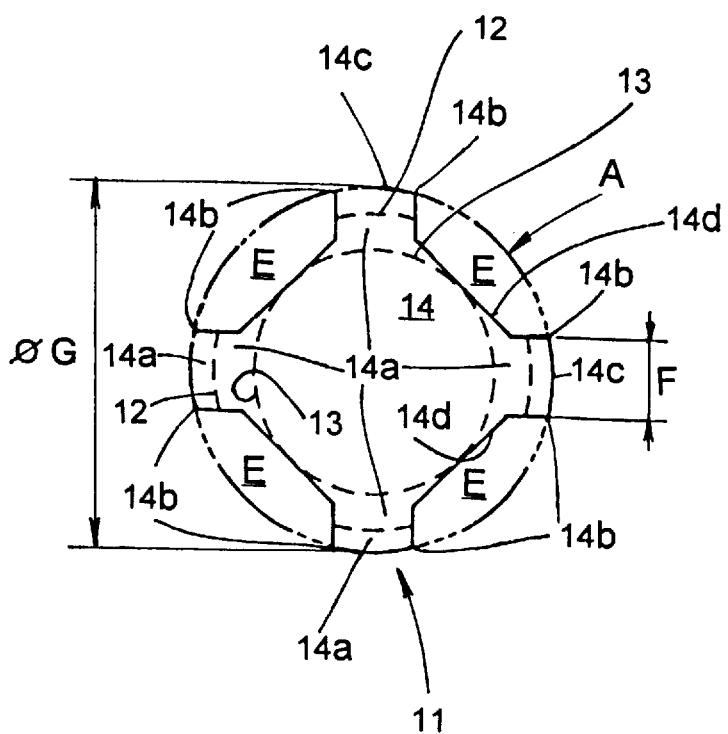
FIG. 2 is a front view of the grooving tool shown in FIG. 1;.
Figure 4:
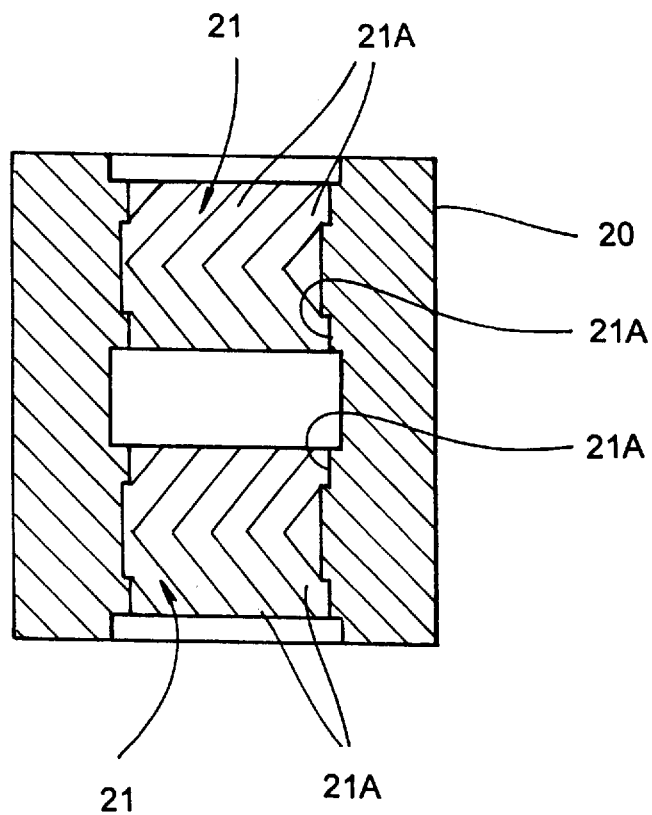
FIG. 4 is a cross section of a hydrodynamic bearing having hydrodynamic pressure-generating grooves.

A grooving tool 11 shown in FIGS. 1 and 2 is used for forming hydrodynamic pressure-generating grooves 21A on the inner surface, that is, on a circular work-hole 21 (a bearing surface) of a hydrodynamic bearing member 20 whose cross-section is shown in FIG. 4. The grooving tool 11 is used by being inserted inside the circular work-hole 21 formed in the hydrodynamic bearing member 20.

The fact that hydrodynamic pressure-generating grooves are formed on a bearing surface of a hydrodynamic bearing member to produce bearing effects is conventionally known; therefore, the detailed description on the hydrodynamic bearing is omitted here.

The grooving tool 11 comprises a tool holder 12 as a base which is attached to a processing machine, and a machining portion 14 for grooving formed on the incoming edge of the tool holder 12 in the axial direction (the left end side in the figure), via a connecting portion 13 whose diameter is smaller than the outer diameter of the tool holder 12.

FIG. 2 shows a front view of the machining portion 14 of FIG. 1 seen from left side. In FIG. 2, the machining portion 14 comprises four tip portions 14a positioned at every quarter around the circumference; the axis of the machining tool and that of the work-hole 21 of the hydrodynamic bearing member 20 are coincided, and the machining tip portions 14a are moved in the axial direction (the horizontal direction in FIG. 1) and the circumferential direction (the direction rotating around the shaft center in FIG. 2) inside the work-hole 21 which is a bearing surface of the bearing member 20, to form hydrodynamic pressure-generating grooves 21A on the inner circle surface of the work-hole 21.

Each of the machining tip portions 14a is protruded outwardly in the radius direction, and the periphery edge thereof is made as a cutting edge. Provided to each of the machining tip portions 14a are axial cutting edges 14b (horizontal direction in FIG. 1) which are parallel to the axis of the machining tool, i.e., which are also parallel to the axial direction of the work-hole 21, and circumferential cutting edges 14c (vertical direction in FIG. 1) which are formed in the circumferential direction orthogonal to the axis of the machining tool, i.e., in the circumferential direction of the work-hole 21. Therefore, the top surface of the machining tip portions 14a is formed in a flat rectangular shape having four edges in the axial and circumferential directions of the machining tool; the edges which extend respectively axially and circumferentially of the rectangular shape are the axial cutting edges 14b and the circumferential cutting edges 14c.

Although the number of the machining tip portions 14a on the machining portion 14 may be determined according to the desired number of grooves, it is preferable, for a stable grooving, to set the number of the machining tip portions 14a to be two or more and to arrange them in the circumferential direction by an equal distance. In the above embodiment, if grooves are firstly formed with the four machining tip portions 14a, and then another grooving is provided between the formally formed grooves, it is easy to obtain eight grooves. For this reason, repeating the grooving with two machining tip portions 14a N times makes it easy to form 2N grooves.

Figure 3:
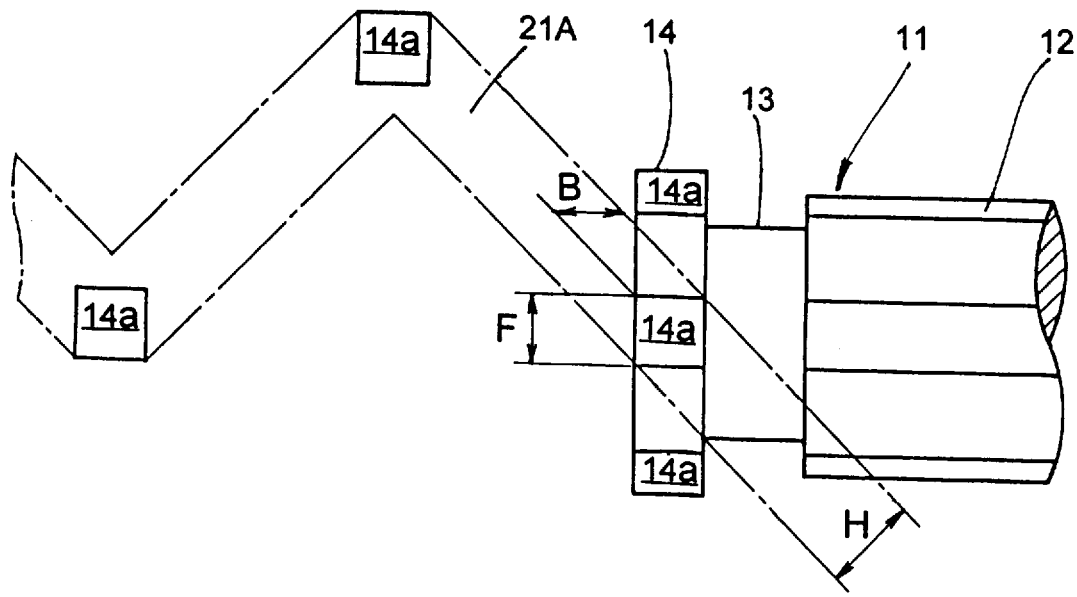
FIG. 3 is a descriptive drawing showing a groove shape formed by the grooving tool shown in FIGS. 1 and 2.
Figure 5:
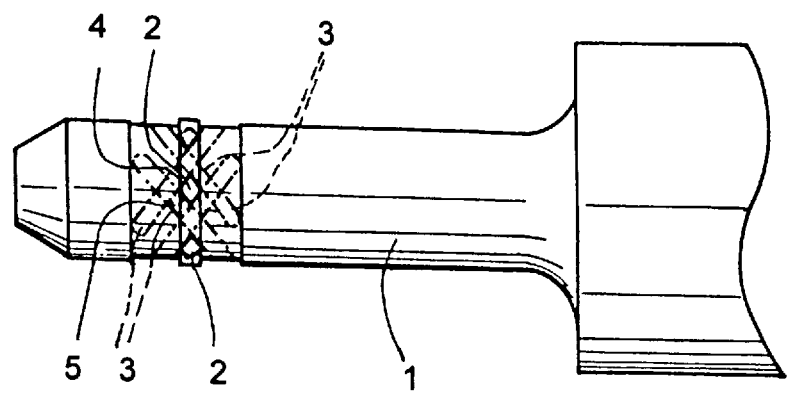
FIG. 5 is a side view showing an example of a conventional grooving tool for the inner surface of a hole.

The machining portion 14 having these axial cutting edges 14b and circumferential cutting edges 14c is held by its tool holder 12 attached to a processing machine while the center axis of the work-hole 21 of the bearing member 20 is coincided with the center axis of the machining portion 14; the grooving tool 11 is moved axially and rotated (moving in the circumferential direction) so as to trace, for example, spirals with a necessary angle for forming grooves with respect to the axis; in this way, spiral or herringbone-configured hydrodynamic pressure-generating grooves 21A as shown in FIGS. 3 and 4 are formed on the inner surface of the hole by the axial cutting edges 14b and the circumferential cutting edges 14c. At that time, since the cutting edges 14b and 14c of the machining portion 14 are formed respectively in the axial and circumferential directions, when the grooving tool 11 is rotated (moving in the circumferential direction) while being moved in the direction identical to the axis, a single hydrodynamic pressure-generating groove is formed by both the axial cutting edges 14b and the circumferential cutting edges 14c. Then, if the lengths of the cutting edges 14b and 14c on the machining portion 14 are set to be B and F respectively, the groove width, H, of a single line of hydrodynamic pressure-generating groove 21 can be defined as the length of diagonal line between the axial cutting edge 14b and the circumferential cutting edge 14c.

Also, the connecting portion 13 is formed circular in cross-section as shown in FIG. 2; the outer diameter thereof is set smaller than each of the outer diameters of the machining portion 14 and the tool holder 12. Further, channels are formed on the tool holder 12 to associate with notches 14d which are made to form the machining tip portion 14a.

When forming the grooving tool 11, first a cylindrical sizing of φC outer diameter is performed on a columnar raw material, which has a diameter required for forming the machining portion 14 and an appropriate hardness for grooving, such that the axial width, B, of the portion A is obtained as the machining portion 14. The circumferential cutting edges 14c are formed simultaneously with or separately from the above process. For this, forming a smaller diameter section over the axial width D as the connecting portion 13 makes it easy to machine the portion A for the machining portion 14.

The portion A where the machining portion 14 is constituted is formed as a flange-like disk as shown by two-dotted chain lines in FIG. 2; then the periphery of the disk is removed in the radius direction so that the machining tip portion 14a remains. The machining tip portion 14a is formed as follows: the periphery of the machining tip portion 14a is cut in parallel with the axial direction so as to form axial cutting edges 14b, and also cut along the circumference so as to form circumferential cutting edges 14c; a predetermined portion E is removed from four places of the disk to form notches 14d; and thus four machining tip portions 14a are formed in the above described shape. Finally, the machining tip portion 14a is finished to the outer diameter of φG by a highly precise cylindrical polishing. A highly precise outer diameter for the machining tip portion 14a can be easily obtained by a cylindrical polishing; the depth of a hydrodynamic pressure-generating groove which is formed on the inner surface of the bearing can be determined by this outer diameter, φG. Therefore, a highly precise hydrodynamic pressure-generating groove having a required groove depth can be formed on the inner surface of the bearing. In addition, since the groove width can be easily determined by the length B of the axial cutting edge 14b and the length F of the circumferential cutting edge 14c of the machining tip portion 14a, a highly precise groove width can be obtained. From this view point, a highly precise hydrodynamic pressure-generating groove can be also formed.

In the above grooving tool 11, the axial cutting edges 14b and the circumferential cutting edges 14c of the machining tip portion 14a can be obtained by performing a simple machining on the columnar raw material in the axial and circumferential directions. For this reason, a highly precise machining portion 14 can be easily obtained by a relatively simple machining means. Further, the highly precise grooving tool 11 contributes to form more precise hydrodynamic pressure-generating grooves 21, decreasing dimension errors in groove width and depth of the hydrodynamic pressure-generating groove.

Note that, as shown in FIG. 2, the outer diameter of the connecting portion 13 is formed smaller than or equal to each of the minimum outer diameters of the machining portion 14 and the tool holder 12. At that time, the channels 12a on the tool holder 12 are formed in the same manner as forming the notch 14d which is used for creating the machining portion 14, or are formed by notching the tool holder 12 in the axial direction simultaneously. In the above embodiment, the channels 12a are formed along the axial direction on the tool holder 12; therefore, the machining particles produced during grooving with the machining tip portion 14a can be exhausted well through the channels 12a.

The embodiment of the present invention by the present inventor has been specifically described above. The present invention, however, is not limited to the above mentioned embodiment, but may be variously modifiable while remaining within the scope of the invention.

For example, although the above mentioned embodiment uses four machining tip portions 14a, the number of the machining tip portion can be set to be 2, 3, 6, 8, etc. accordingly. Also, the present invention has been applied to a grooving tool which is used for forming hydrodynamic pressure-generating grooves in a hydrodynamic bearing apparatus; however, it is not limited to this application. The present invention may be applied to grooving tools used for grooving the inner surface of various kinds of holes.

Further, the channels 12a on the tool holder 12 in the above embodiment are not necessarily provided, but a tool holder may be a columnar bar without channels. Moreover, a guide member may be protruded at the incoming edge of the machining portion for insertion of the tool into the hole.

According to the present invention, axial cutting edges and circumferential cutting edges are formed on the machining portion by a simple machining in the axial and circumferential directions so that a highly precise machining tip portion can be formed easily, increasing process precision of the tool itself to form a highly precise groove thereby. Therefore, a grooving tool which can perform a highly precise grooving can be efficiently obtained by a relatively simple means; this improves productivity of the grooving tool and increases the grooving performance.

Also, applying the grooving tool of the present invention to a grooving tool which is used for forming hydrodynamic pressure-generating grooves of a hydrodynamic bearing apparatus can provide a method for forming hydrodynamic pressure-generating grooves in which machining precision for the hydrodynamic pressure-generating grooves is improved.

While the foregoing description and drawings represent the preferred embodiments of the present invention, it will be obvious to those skilled in the art that various changes and modifications may be made therein without departing from the true spirit and scope of the present invention.

What is claimed is:

1. In a method for forming hydrodynamic pressure-generating grooves, in which a machining portion held by a tool holder is inserted into a circular work-hole, a bearing surface of a bearing member, to form hydrodynamic pressure-generating grooves on the inner surface of said work-hole by relatively and simultaneously moving machining tip portions provided on said machining portion in the axial and circumferential directions in said work-hole, the improvement comprising the steps of:

providing said machining tip portion with an axial cutting edge, formed in parallel with said axial direction, and a circumferential cutting edge, formed along said circumferential direction; and moving said machining tip portion relatively and simultaneously in the axial and circumferential directions in said work-hole so that a single hydrodynamic pressure-generating groove can be formed by both said axial cutting edge and said circumferential cutting edge which are formed on one machining tip portion.

2. The method of forming hydrodynamic pressure-generating grooves as set forth in claim 1, wherein said machining tip portion comprises two parallel cutting edges in the axial direction and two parallel cutting edges in the circumferential direction.

3. The method of forming hydrodynamic pressure-generating grooves as set forth in claim 2, wherein two or more machining tip portions are formed such that the periphery of a disk is notched in the radius direction to produce said axial cutting edges and said circumferential cutting edges on the outer periphery of said disk.

4. The method of forming hydrodynamic pressure-generating grooves as set forth in claim 3, wherein said two or more machining tip portions are formed at an equal distance on the circumference so that many hydrodynamic pressure-generating grooves are formed by repeating the grooving with said machining tip portions.

* * * * *